United States Patent [19]

Shiota

[11] Patent Number: 5,212,512
[45] Date of Patent: May 18, 1993

[54] PHOTOFINISHING SYSTEM

[75] Inventor: Kazuo Shiota, Kanagawa, Japan

[73] Assignee: Fuji Photo Film Co., Ltd., Kanagawa, Japan

[21] Appl. No.: 799,958

[22] Filed: Nov. 29, 1991

[30] Foreign Application Priority Data

Nov. 30, 1990 [JP] Japan .................................. 2-339170
Nov. 30, 1990 [JP] Japan .................................. 2-339171

[51] Int. Cl.$^5$ ............................................. G03D 3/08
[52] U.S. Cl. .................................................. 354/319
[58] Field of Search ....................... 354/297, 319–324, 354/354

[56] References Cited

U.S. PATENT DOCUMENTS 5,083,155  1/1992  Kataoka et al. ................. 354/275 X
5,093,686  3/1992  Shigaki ................................. 355/77

FOREIGN PATENT DOCUMENTS 62-103625  5/1987  Japan .
62-208028  9/1987  Japan .
1-279231  11/1989  Japan .
1-279250  11/1989  Japan .
1-289948  11/1989  Japan .

Primary Examiner—D. Rutledge
Attorney, Agent, or Firm—Sughrue, Mion, Zinn, MacPeak & Seas

[57] ABSTRACT

A plurality of exposed photographic films of different types, which are contained in respective different type film cartridges, are developed and wound up individually into wind-up cartridges, on which identification data indicating the type of the photographic film wound in each wind-up cartridge is recorded. In printing, the type of each of the different type photographic films is discriminated based on the identification data recorded on the wind-up cartridges, so as to change over printing sequence according to the film type. The type of the film cartridge positioned in a film pull out position of the film processor is discriminated and memorized, so as to select a wind-up cartridge having a film type identification mark corresponding to the developed film to be wound up, or to write film type identification data in an IC memory of the wind-up cartridge during or after winding up the developed film. If a predetermined type of photographic films are contained in such film cartridges that have the same shape as the wind-up cartridges, the film cartridges of the predetermined type films are reused as wind-up cartridge.

28 Claims, 10 Drawing Sheets

FIG. 4

PHOTOFINISHING SYSTEM

BACKGROUND OF THE INVENTION

1. Field of the Invention

The present invention relates to a photofinishing system for processing and printing photographic films. More particularly, the present invention relates to a photofinishing system wherein different types of photographic films are individually wound into preservation cartridges after development. The preservation cartridges are adapted to printing any type of photographic film in the same printer.

2. Description of the Related Art

It is well known in photofinishing systems to record various photographic data, such as print magnification data, during photographing or after development, on a transparent magnetic recording layer provided on the rear surface of a photographic film opposite to the photosensitive surface. These systems automatically make appropriate prints with reference to this print data. (For example, U.S. patent application No. 07/757,353, filed on Sep. 10, 1991; Japanese Laid-open Patent Publication Nos. 62-103625, 62-208028, 1-279231, 1-289948). Conventional photographic films are cut into pieces, each containing several frames, e.g., six frames, after development and printing. If such a photo-graphic film having a magnetic recording layer, is cut into pieces in the conventional manner, the magnetic recording layer may be divided so as to render the data unreadable. In order to avoid such damage to data recorded on a film, a film cartridge for holding the film after development, in the form of a roll therein, without the need for cutting the film has been proposed (Japanese Laid-open Patent Publication No. 1-279250).

Also, a new type of film cartridge has been developed from which the film leader car be propelled outside of the cartridge by rotating the spool thereof. Such a film cassette is smaller than the conventional 135-type film cartridge (U.S. patent application Nos. 07/650,350 and 07/739,374 filed respectively on Feb. 4, 1991 and Aug. 2, 1991). Due to the film leader propelling function, this new type film cartridge can be reused for holding a developed or printed film in the form of a roll. Rewinding a film after development into the emptied cartridge from which the same, or another film, has been pulled out is desirable because it reduces industrial waste.

However, because many widely used films, such as 135-type films, have no film leader propelling function or magnetic recording layer, when the new type film cartridges are brought to the market, photofinishers will have to deal with both conventional and new types of films. Therefore, it would be desirable to process both types of films efficiently with the same machinery and at a low cost.

SUMMARY OF THE INVENTION

In view if the foregoing, a principal object of the present invention is to provide a photofinishing apparatus and method which has the ability to deal with a plurality of different types of film, such as the above-mentioned conventional film and new type of film.

Another object of the present invention is to provide a film processor by which conventional film and the new type of film are developed and, thereafter, wound into individual preservation cartridges of the same shape.

To achieve the above and other objects, according to the present invention, after developing a plurality of exposed photographic films of different types which are contained in individual film cartridges, the developed films are wound up individually into wind-up cartridges, on which identification data, indicating the type of the photographic film wound in each windup cartridge, is recorded.

During printing, the type of photographic film is discriminated based on the identification data recorded on the wind-up cartridges, so as to adjust a printing sequence to correspond to the film type.

According to a preferred embodiment, if a predetermined type of photographic film is contained in film cartridges that have the same shape as the wind-up cartridges, these film cartridges are reused as wind-up cartridges.

A film processor of the present invention discriminates and memorizes the type of the film cartridge positioned in a film pull-out position of the film processor, and winds up the developed films each individually in a wind-up cartridge having a corresponding film type identification mark. The identification marks can be an electroconductive pattern or physical projections or the like. The corresponding wind-up cartridge is selected, based on the memorized film cartridge type, from a plurality of wind-up cartridges having different film type identification marks.

Another embodiment of the present invention discriminates and memorizes the type of film cartridge positioned in a film pull-out position of the film processor, and winds up the developed films individually in a specific wind-up cartridge having a recording medium, such as an IC memory, thereon. Film type identification data is written, based on the memorized film cartridge type, upon winding up of the developed film.

BRIEF DESCRIPTION OF THE DRAWINGS

The above and other objects and advantages of the present invention will become more apparent from the following detailed description when read in connection with the accompanying drawings, in which:

FIG. 4 is a schematic view of a printer-processor for use in the photofinishing system according to the first embodiment of the present invention;

DETAILED DESCRIPTION OF THE PREFERRED EMBODIMENTS

Figure 1:
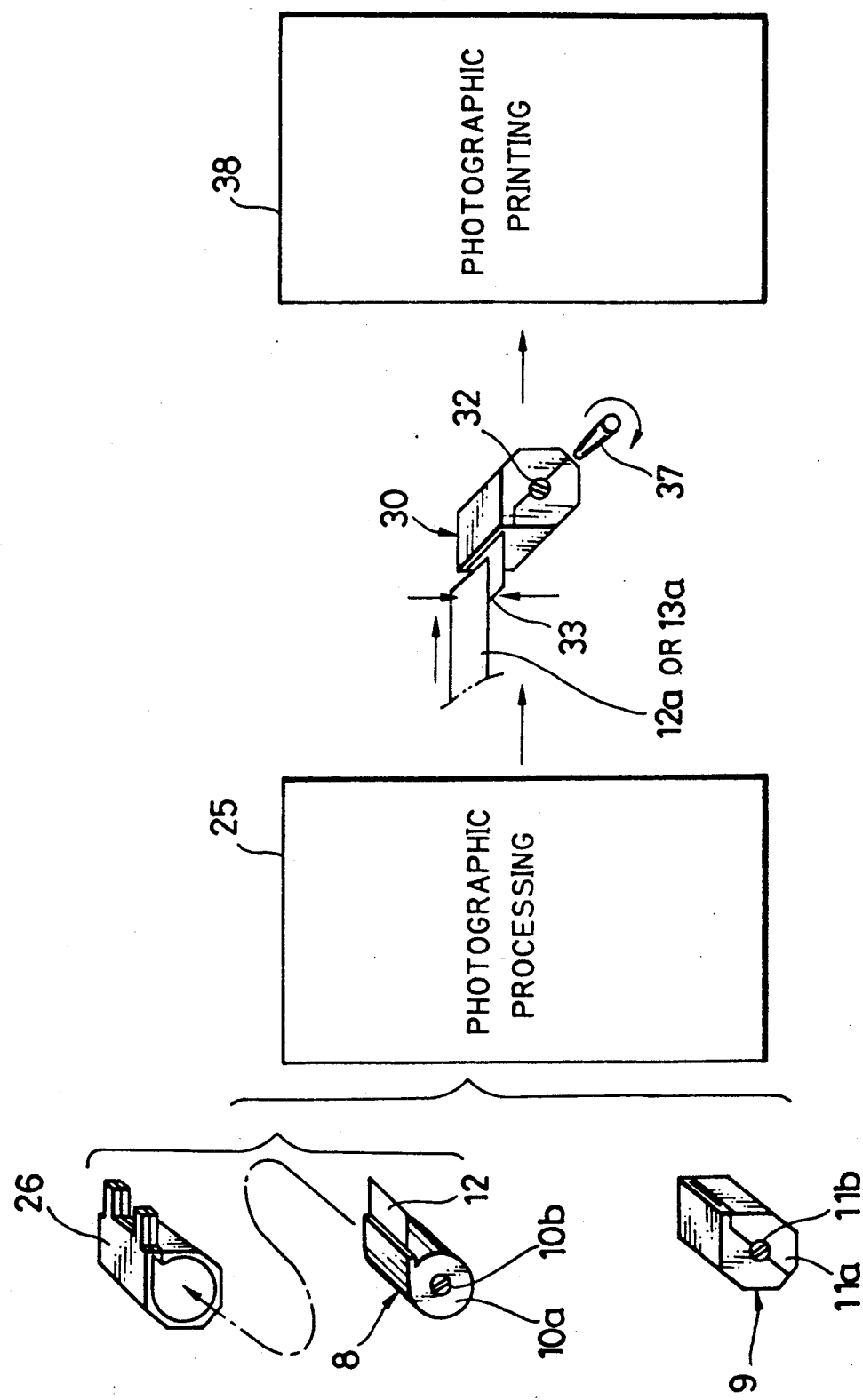
FIG. 1 schematically illustrates a photofinishing system according to the first embodiment of invention.

There are at least two types of film cartridges that may be processed in a photofinishing system, according to the first embodiment shown in FIG. 1. One type is a conventional film cartridge of ISO 135 film, or a 135 type film cartridge 8, and the other is a new type film cartridge 9. Both types of film cartridges have substantially the same fundamental constructions, namely, each consists of a housing 10a, 11a, spool 10b, 11b rotatably mounted in the housing 10a, 11a, and a photographic film 12, 13 wound about the spool 10b, 11b with the trailing end of the photographic film attached thereto.

The primary differences between the new type film cartridge 9 and the conventional 135-type film cartridges 8 are that the new type film cartridge 9 has the above described film leader propelling function, and that the film 13 of the new type film cartridge 9 is provided with a magnetic recording layer.

Figure 2:
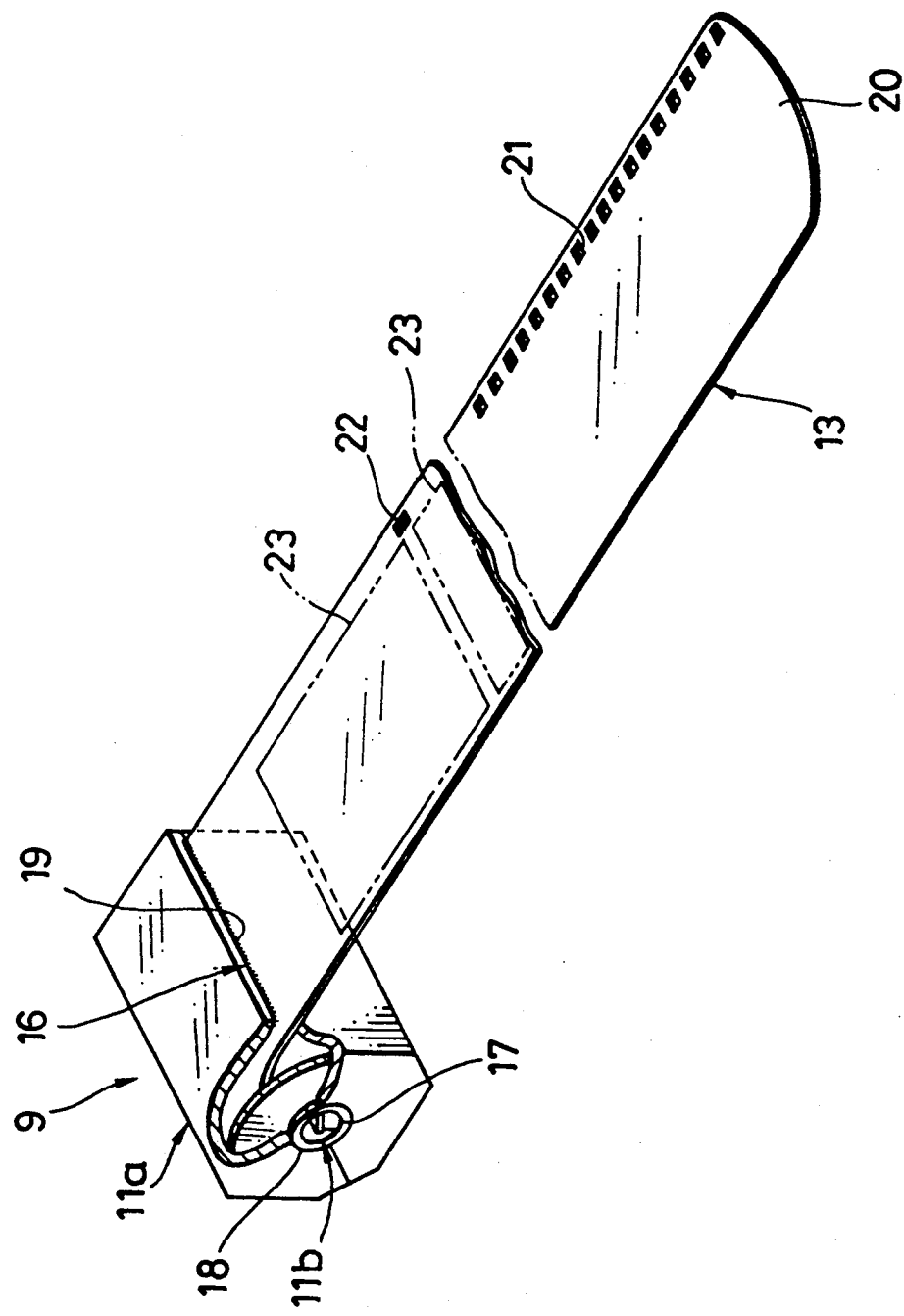
FIG. 2 is a perspective view of a new type film cartridge with a photographic film pulled out therefrom.

As shown in FIG. 2, the housing 11a of the new type film cartridge 9 is formed in the shape of a polygonal barrel by joining shell half parts, each molded from synthetic resin or the like. The housing 11a is provided with a film passage mouth 16 for allowing the photographic film 13 to exit the housing 11a, and an opening 18 for exposing a coupling end 17 of the spool 11b to the outside of the cassette. Plush or light trapping fabric 19 is attached to the film passage mouth 16. The internal peripheral surface of housing 11b is formed cylindrically and has a diameter substantially equal to the maximum diameter of photographic film 13 as wound about spool 11b. When spool 11b is rotated in the film unwinding direction, the film leader of photographic film 13 is guided by the internal surface of housing 11b, and is propelled out of housing 11a through film passage mouth 16.

It is to be noted that housing 11b is shaped to be a polygonal barrel so as to ensure stability when a plurality of film cassettes are piled on one another. Of course, the housing 11b may also be cylindrical, similar to conventional film cartridges.

Leading end 20 of photographic film 13 is rounded so as to reduce resistance to feeding the photographic film 13 when film leader 20 is propelled out of the new type film cartridge 9. Perforations 21 are formed in one side edge of film leader 20 so as to engage a sprocket of a camera for feeding the film leader 20 to the take-up spool of the camera after exiting the new type film cartridge 9. Subsequently, perforations 21 are caught on claws disposed on the take-up spool, thereby securing the photographic film 13 to the take-up spool. A main portion of the photographic film 13 is provided with positioning perforations 22, one corresponding to each of the frames 23 to be exposed. The positioning perforations 22 are detected either mechanically or optically in order to position each of the frames 23 to be exposed on an exposure frame of the camera.

As shown in FIG. 1, photographic films 12 and 13 respectively drawn from the 135-type cartridge 8 and new type film cartridge 9 are, after being subjected to photographic processing in processor 25, individually wound up into preservation cartridges 30. It is possible to develop the 135-type film 12 and new type film 13 separately, or to develop both types together in the same film processor. In order to handle the 135-type film cartridges 8 together with the new type film cartridges 9, the 135-type film cartridges 8 are each inserted in a cartridge adapter 26 with the film leader of the film 12 pulled out of the housing 10a. The cartridge adapter 26 has a contour which is similar to that of the housing 11a of the new type film cartridge 9, and enables the film processor to nip and pull out the film leaders of the 135 type film cartridges 8 in a manner similar to the new film cartridges 9, while protecting the film leader outside of the housing 10a from being damaged.

Figure 3:
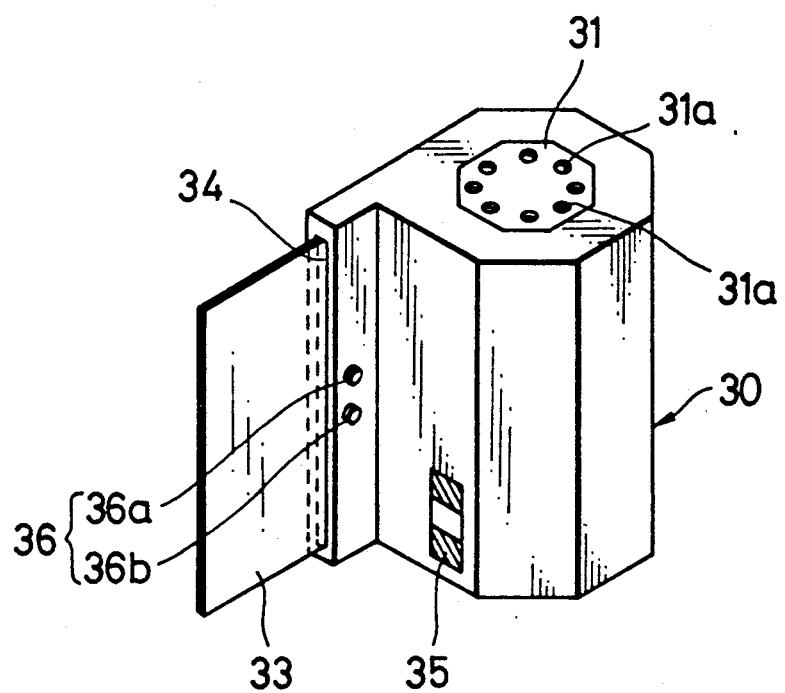
FIG. 3 is a perspective view of a preservation cartridge for holding a film after development and/or printing for use in the photofinishing system.

The preservation cartridge 30 has substantially the same contour and construction as the new film cartridge 9. The difference between the new film cartridge 9 and the preservation cartridge 30 is that the preservation cartridge 30 is providing with an IC memory 31, or the like, (see FIG. 3) for recording photographic data such as film data, photographing data, print data and so forth. The preservation cartridge 30 also has a connecting sheet 33 protruding from a film passage mouth 34 of the cartridge 30. One end of the connecting sheet 33 is attached to a spool 32 of the preservation cartridge 30, and the other end thereof is adapted to connect a developed 135 type film 12a or a developed new type film 13a to the connecting sheet 33 so as to wind up the developed film 12a or 13a on the spool 32. The IC memory 31 is embedded in an end surface of the preservation cartridge 30 that is opposite to the end surface from which a coupling end of the spool 32 protrudes. When the developed film 12a or 13a is connected to the connecting sheet 33, a fork 37 engages the coupling end of the spool 32 and rotates the spool 32 so as to wind up the developed film 12a or 13a into the preservation cartridge 30.

At this time, it is possible to record data about film contained in the preservation cartridge 30, e.g. film type data, in the IC memory 31, so as to allow discrimination of the type of film to be printed. For example, if the film is developed 135-type film 12a, default data indicating that the contained film is developed 135-type is recorded in the IC memory 31. If the film is of a new type film 13a, photographic data recorded in the magnetic recording layer of the film 13 is sent to the IC memory 31.

The preservation cartridge 30 is further provided with film type index marks 35 and 36. The index mark 35 is a pattern printed in electro-conductive paint on a peripheral surface of the preservation cartridge 30. The index mark 36 is constituted by two pins 36a and 36b disposed near the film passage mouth 34. In place of index marks 35 and 36, it is possible to provide a slidable member which can be switched over between to positions, one of which is indicative of the developed new type film 13a and the other indicative of the developed 135-type film 12a.

Figure 4:
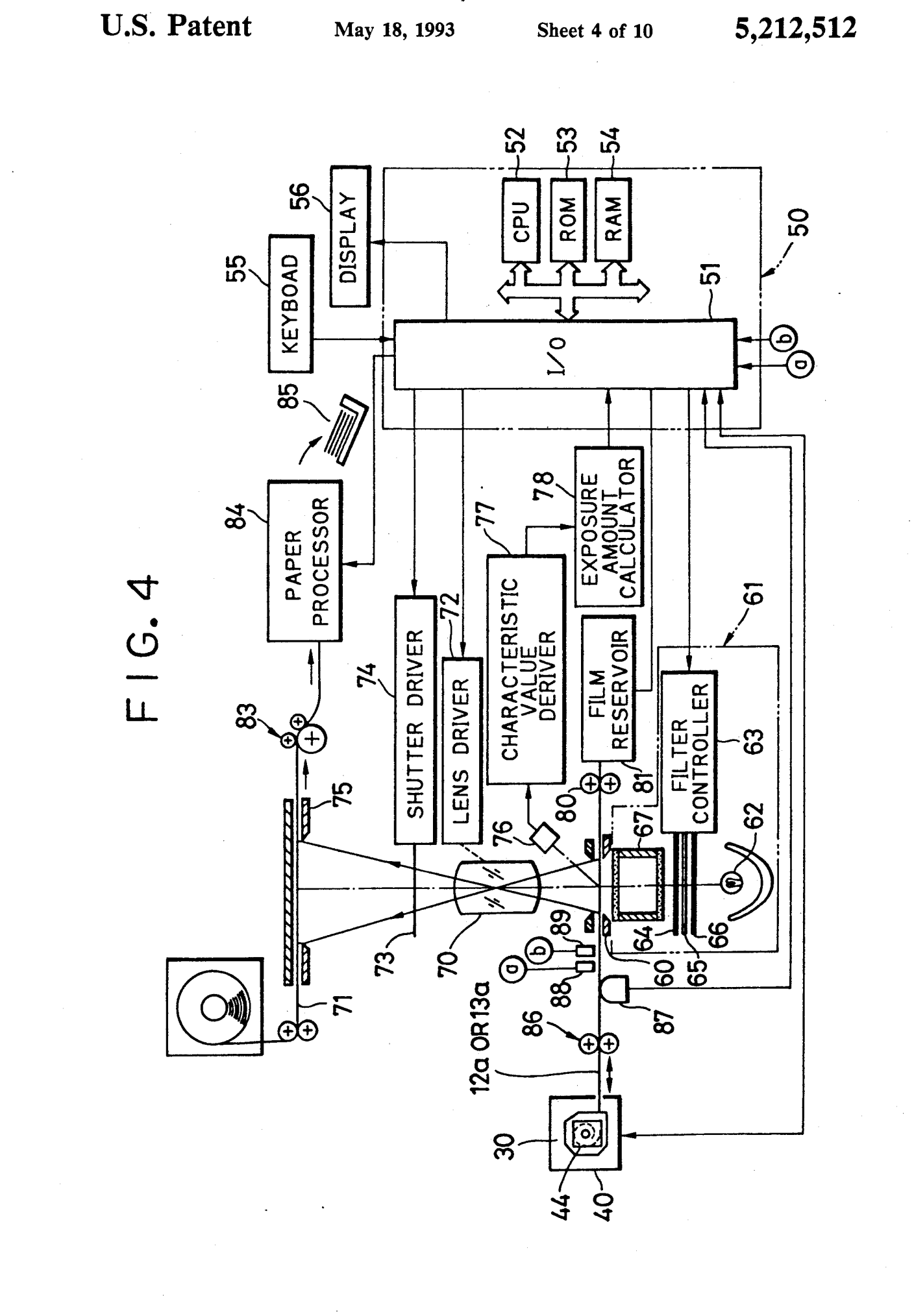
Figure 5:
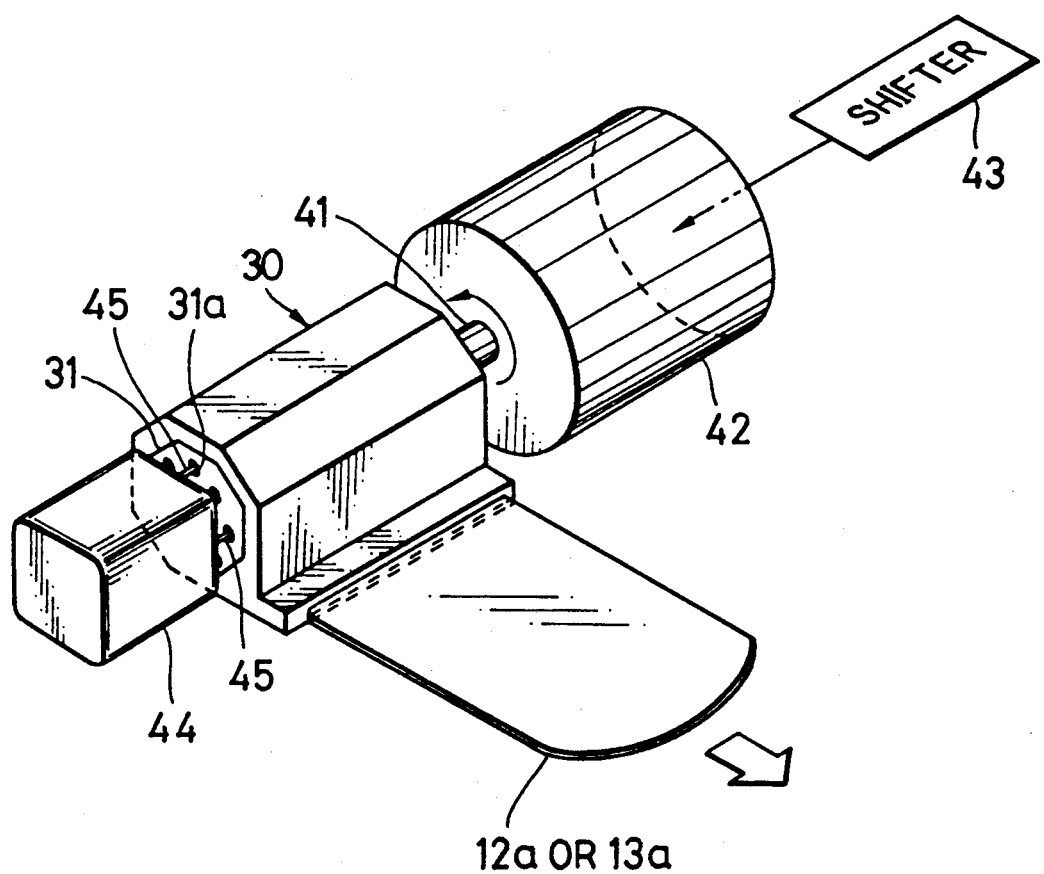
FIG. 5 is a perspective view of a film propelling section of the printer-processor shown in FIG. 4.

A printer processor of the first embodiment shown in FIG. 4 has a film feeding section 40 in which the preservation cartridge 30 containing either a developed 135-type film 12a or new type developed film 13a is set. As shown in FIG. 5, the film feeding section 40 consists of a fork 41 for rotating the spool 32 of the preservation cartridge 30, a bi-directional directional motor 42 for rotating the fork 41, a shifter 43 for shifting the fork 41 in an axial direction, and a plug 44 for reading from and writing to the IC memory 31. The plug 44 has contact pins 45 which are disposed corresponding to contacts 31a of the IC memory 31. The plug 44 is electrically connected to a controller of the printer-processor.

The controller 50 is a conventional microcomputer having an I/O interface 51, CPU 52, ROM 53, RAM 54, a keyboard 55 and a display 56. The I/O interface 51 is adapted to be connected to the IC memory 31 through the plug 44, so as to read various data from the IC memory 31 and write print data and the like to the IC memory 31 after making prints from the developed 135 type film 12a or developed new type film 13a contained in the preservation cartridge 30. The controller 50 sequentially controls respective sections of the printer-processor according to a program stored in the ROM 53 and selects an appropriate program sequence according to the film type, based on the film type data recorded in the IC memory 31.

When the preservation cartridge 30 is positioned in the film feeding section 40, the shifter 43 is activated to move the fork 41 so as to engage the coupling end of the spool 32. Then, the motor 42 is driven to rotate the fork 41 in a direction so as to propel the developed 135 type film 12a or developed new type film 13a outside of the preservation cartridge 30 through the film passage mouth 34. The photographic film thus propelled out is transported to a film carrier 60 which is positioned in a predetermined print station.

Below the film carrier 60, there is a conventional light source section 61 which comprises a light source 62 and a filter controller 63 for controlling three color filters 64, 65 and 66 so as to adjust color balance and intensity of exposure light from the light source 62. The light source section 61 also has a mixing box 67 for diffusing, and thus equalizing, the exposure light passing through the color filters 64 to 66. A zoom lens 70 is disposed above the fill carrier 60 for forming an image of each picture frame 23 to be printed, which is positioned in the film carrier 60, on a photosensitive emulsion layer of color paper 71. The zoom lens 70 is driven by a lens driver 72 so as to set the zoom lens 70 at a print magnification according to a print magnification signal from the controller 50. A shutter 73 is disposed between the zoom lens 70 and the color paper 71, and is driven by a shutter driver 74. A conventional paper framing mask 75 is disposed at a printing portion of the color paper 71.

A scanner 76 for three color separation light measurement of each frame 23 to be printed is disposed diagonally above the film carrier 60. The photometric data detected by the scanner 76 is sent to a characteristic value deriver 77, wherein various characteristic values necessary for exposure calculation are derived from the photometric data. An exposure amount calculator 78 determines an exposure amount of each frame 23 to be printed based on the various characteristic values in accordance with conventional exposure calculating formulas. The controller 50 determines the positions of the respective color filters 64 to 66 depending on the exposure amount, and controls the filter controller 63 correspondingly.

The film portion with frames having been subjected to printing is transported by a pair of film feed rollers 80, disposed at the exit of film carrier 60, toward a film reservoir 81. The film reservoir 81 reserves the film portion in the form of loops. The paper portion, having images printed thereon, is transported by a pair of paper feed rollers 83 toward a paper processor 84. The paper processor 84 develops the paper 71 and, thereafter, cuts the paper 71 into individual prints. The prints are ejected into a print stock portion 85.

If the photographic film positioned in the film feeding section 40 is a developed new type film 13a, the following sequence is executed. First, the film leader of developed new type film 13a is propelled out of the preservation cartridge 30 in the film feeding section 40. Then, the developed new type film 13a is transported by the film feed rollers 86 to the film carrier 60. During transporting the film, a magnetic reading device 87 reads photographic data such as film data, photographing data, print order data, and the like, from the magnetic recording layer of the developed new type film 13a. This data is stored in the RAM 54. Thereafter, each frame 23 to be printed is positioned in the film carrier 60 by advancing the film by a predetermined length after a perforation sensor 88 detects one of the perforations 22.

The scanner 76 photometrically measures the frame positioned in the film carrier 60, and an exposure amount is calculated by the characteristic value deriver 77 and the exposure amount calculator 78 based on the photometric data. In order to correct the exposure amount based on the photographing data recorded on the film 13a, the controller 50 determines exposure correction data based on the photographing data and sends it to the exposure amount calculator 78. If pseudo zooming data requesting a pseudo zoom printing, by which only a predetermined part of a frame 23 is enlarged and printed so that the consequent print will contain a picture as if taken using a zoom lens, is present, then the magnification of the zoom lens 70 is determined based on this data. Thereafter, the filter controller 63 is driven to control the color balance and density of print-exposure light, and the shutter 73 opens for a given time, making a print of the frame 23 positioned in the film carrier 60. After printing, the paper 71 and the film 13a are advanced by one frame.

If, on the other hand, the film positioned in the film feeding section 40 is a developed 135-type film 12a, margin sensor 89 detects the margin of each frame bordering the blanks between the frames, and the frame to be printed is positioned in the film carrier 60 with reference to the margin detection signal from the margin sensor 89. Because the developed 135-type film 12a has no recording data, such as film data or photographic data, thereon, the magnetic reading device 87 is not activated. Other printing processes are performed in the same way as for the new type film, and thus further description thereof will be omitted.

When all of the frames have been printed, the developed 135 type film 12a or developed new type film 13a reserved in the film reservoir 81, is wound back into the cartridge 30 by rotating the spool 32 through the fork 41 in a direction so as to wind up the film on the spool 32 of preservation film cartridge 30. During rewinding the film or immediately after rewinding the film, if the film is of a developed 135-type film 12a, exposure conditions such as density correction value and color correction values of each frame used for initial printing are recorded along with the associated frame number in the IC memory 31. If the film is of a developed new type film 13a, and various photographic data has already been read from the magnetic recording layer and written in the IC memory 31 during development, additional data about the print conditions used in printing is recorded in the IC memory 31 at this time. If the above-mentioned various photographic data recorded on the developed new type film 13a has not yet been written in the IC memory 31, this data is recorded simultaneously with the print data in the IC memory 31.

Figure 6:
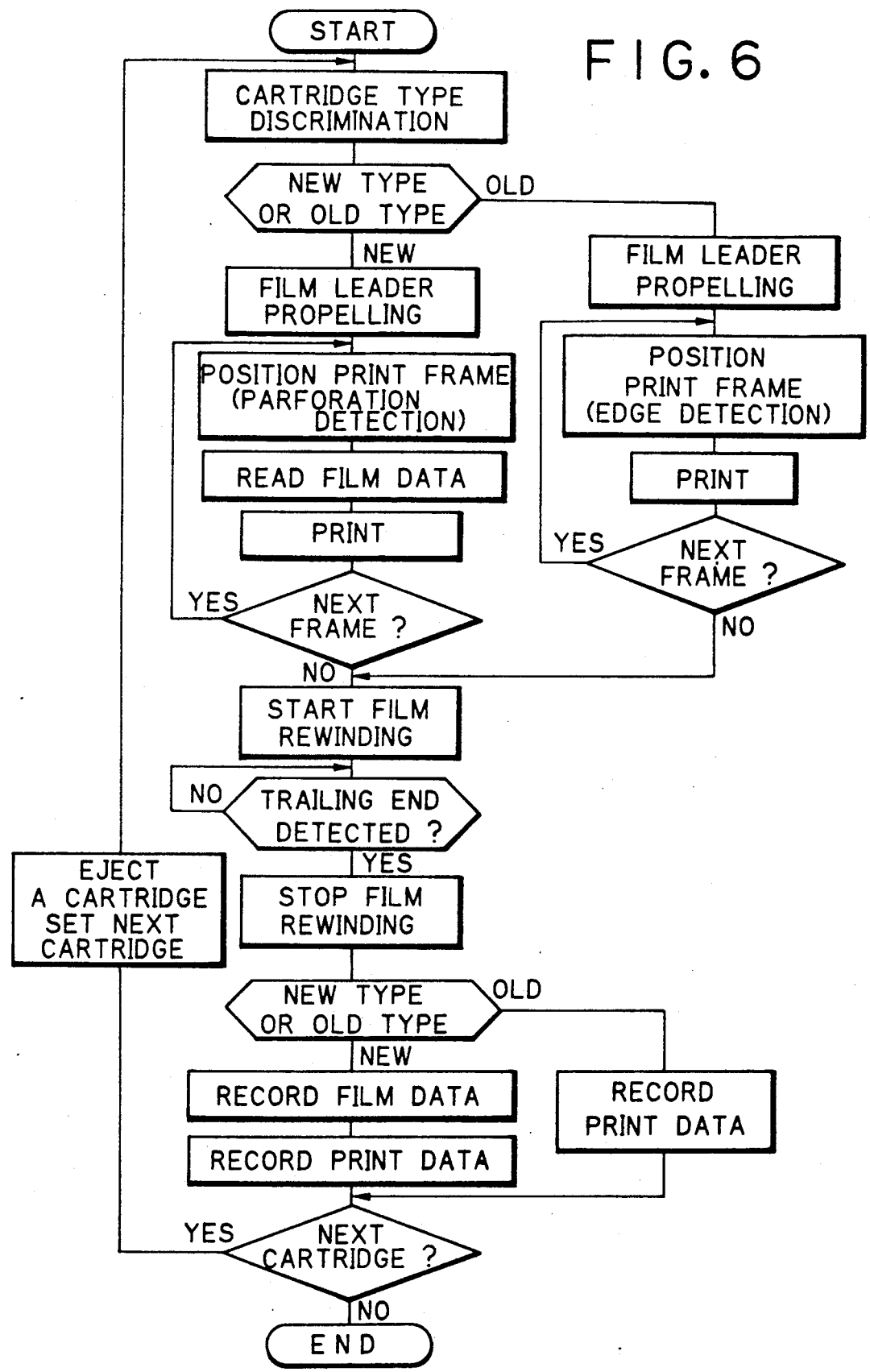
FIG. 6 is a flowchart explaining a sequence of printing in the printer-processor.

After recording data in the IC memory 31, the preservation cartridge 30 is removed from the film feeding section 40, and another preservation cartridge 30 is positioned therein, thereby subjecting it to the same process as above. FIG. 6 is the flowchart of the above-described printing process.

In case some prints contain pictures of poor quality and thus need re-printing, the preservation cartridge 30, having the corresponding film is again positioned in the film feeding section 40. Then, the frames to be re-printed are designated through keyboard 55. In re-printing, the controller 50 causes the display 56 to display data about the frame to be re-printed, such as film data, photographic data, and print data, which is read from the IC memory, for each frame. By operating the keyboard 55, a corrected printing condition for re-printing is determined with reference to the displayed data, and the corrected printing condition is entered along with a designated frame number into the RAM 54 of the controller 50. This operation is repeated until all the frames to be reprinted have been designated and the corrected printing conditions thereof have been entered. Based on this re-printing data, re-printing is performed in a manner similar to the initial printing. After reprinting, data on the corrected printing conditions is recorded in the IC memory 31 in accordance with the frame number.

For additional printing a reception unit is used to enter frame number data and data on the number of prints to be made from each frame in the IC memory provided on the cartridge containing a developed film. Therefore, the reception unit should have the same plug as the film feeding section of the printer-processor for reading from and writing data into the IC memory.

As described above, because the new type film cartridge 9 also has a film propelling function similar to the preservation cartridge 30, it is desirable to reuse an emptied new type film cartridge 9a from which exposed new type films 13 have been separated, to rewind and preserve the developed new type films 13a therein. Such an operation reduces industrial waste.

Figure 7:
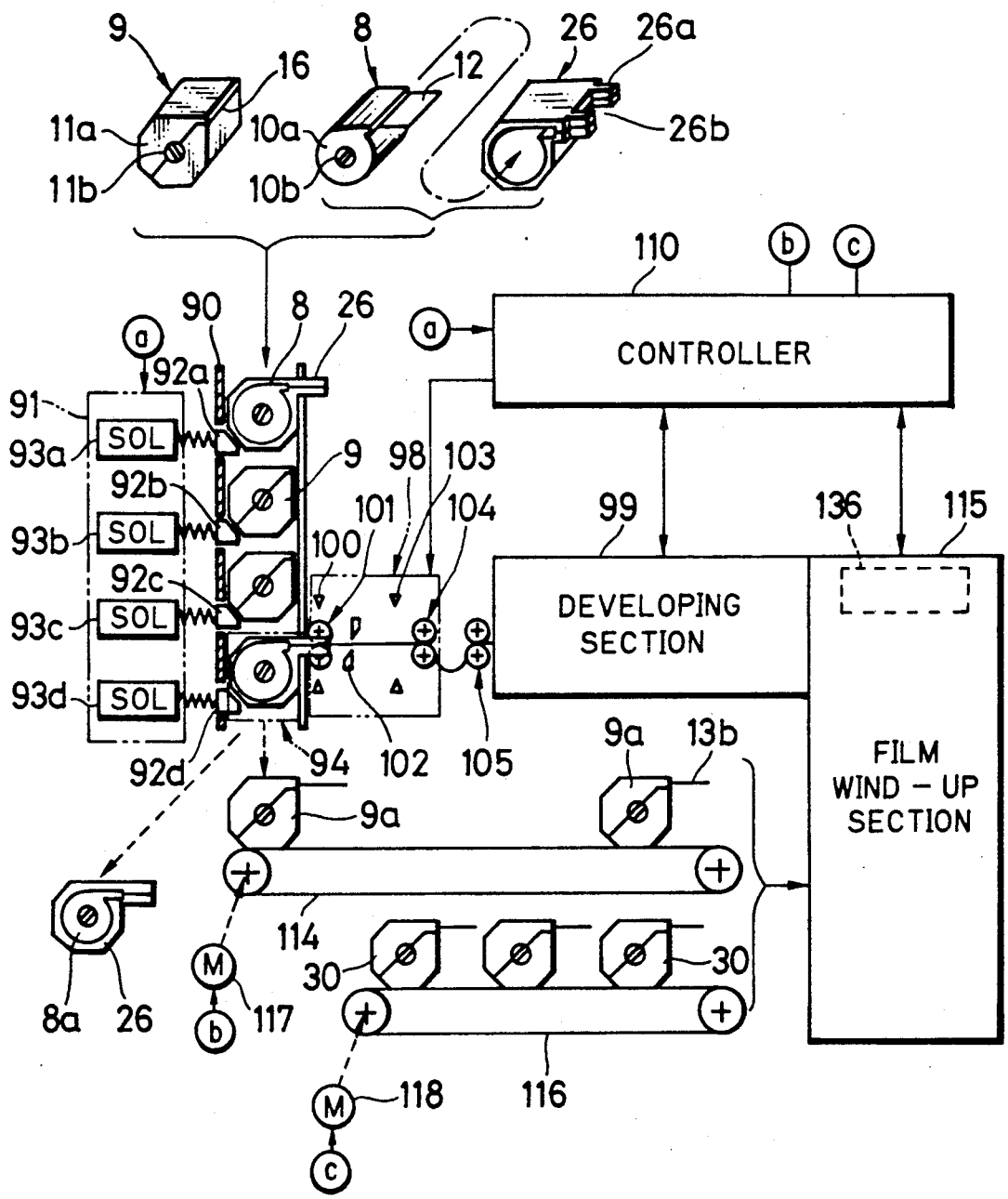
FIG. 7 is a schematic view of a film processor for use in the photofinishing system according to a second embodiment of the present invention.

FIG. 7 shows a second embodiment of the present invention which can develop both of 135-type film cartridges 8 and new type film cartridges 9 without the need for sorting them. Developed 135-type films 12a are wound into preservation cartridges 30, whereas developed new type films 13a are wound back into emptied new type film cartridges 9a. In a manner similar to the above described embodiment, the film leaders of 135-type films 12 are pulled out of their cartridge housings 10a, using a specific clutching tool, and then, the 135-type film cartridges 8 are inserted in the cartridge adapters 26, before being positioned in a cartridge feeder 90 of the film processor.

The cartridge feeder 90 is formed in the shape of an elevational rectangular tunnel (see also FIG. 8), in which both 135-type film cartridges 8 and new type film cartridges 9 are contained, indiscriminately, with their film passage mouths directed in the same direction where an opening for exposing the film leaders pulled out from the 135-type film cartridges 8 is formed with guide rails 90a on both sides thereof. The opening is slightly wider than the width of 135-type film 12. The cartridge adapter 26 has a pair of film leader protecting lugs 26a corresponding to the film passage mouth of the 135 type film cartridge 8 inserted therein. The film leader protecting lugs 26a gently hold the film leader therebetween at both side edges of the film leader. When the 135-type film cartridge 8 contained in the cartridge adapter 26 is inserted in the cartridge feeder 90, the film leader protecting lugs 26a protrude from the cartridge feeder 90 and slide along the guide rails 90a. The film leader protecting lugs so as to allow the film leader of the 135-type film 12 to be nipped in the film pull stage 94. The polygonal cartridge adapter 26 not only protects the film leader but also prevents the cylindrical 135-type film cartridge from rotating in the cartridge feeder 90.

The cartridge feeder 90 is provided with a feeding mechanism 91. The feeding mechanism 91 has stopper pins 92a to 92d selectively projectable into, and retractable from, the cartridge feeder 90, and solenoids 93a to 93d for driving the stopper pins 92a to 92d, respectively. The number of stopper pins 92 and the solenoids 93 may be more than four, and corresponds to the maximum number of cartridges that the cartridge feeder 90 can accommodate. The solenoids 93a to 93c except the solenoid 93d for driving the lowest stopper pin 92d are activated sequentially from the bottom, so as to retract the stopper pins 92a to 92c, sequentially from the bottom, each for a time period necessary to drop a cartridge to the next stage. In this way, the cartridges drop down one after another to a film pull stage 94 disposed at the bottom of the film feeder 90. The solenoid 93d is driven only when the 135-type film cartridge 8 has been positioned in the film pull stage 94 and the 135-type film 12 has been pulled out and removed from the cartridge 8, so as to drop the emptied 135 type cartridge 8a into a discard box, or the like. The emptied 135 type cartridges 8a are then removed from the cartridge adapters 26 and are discarded, while the cartridge adapters 26 are reused.

Figure 8:
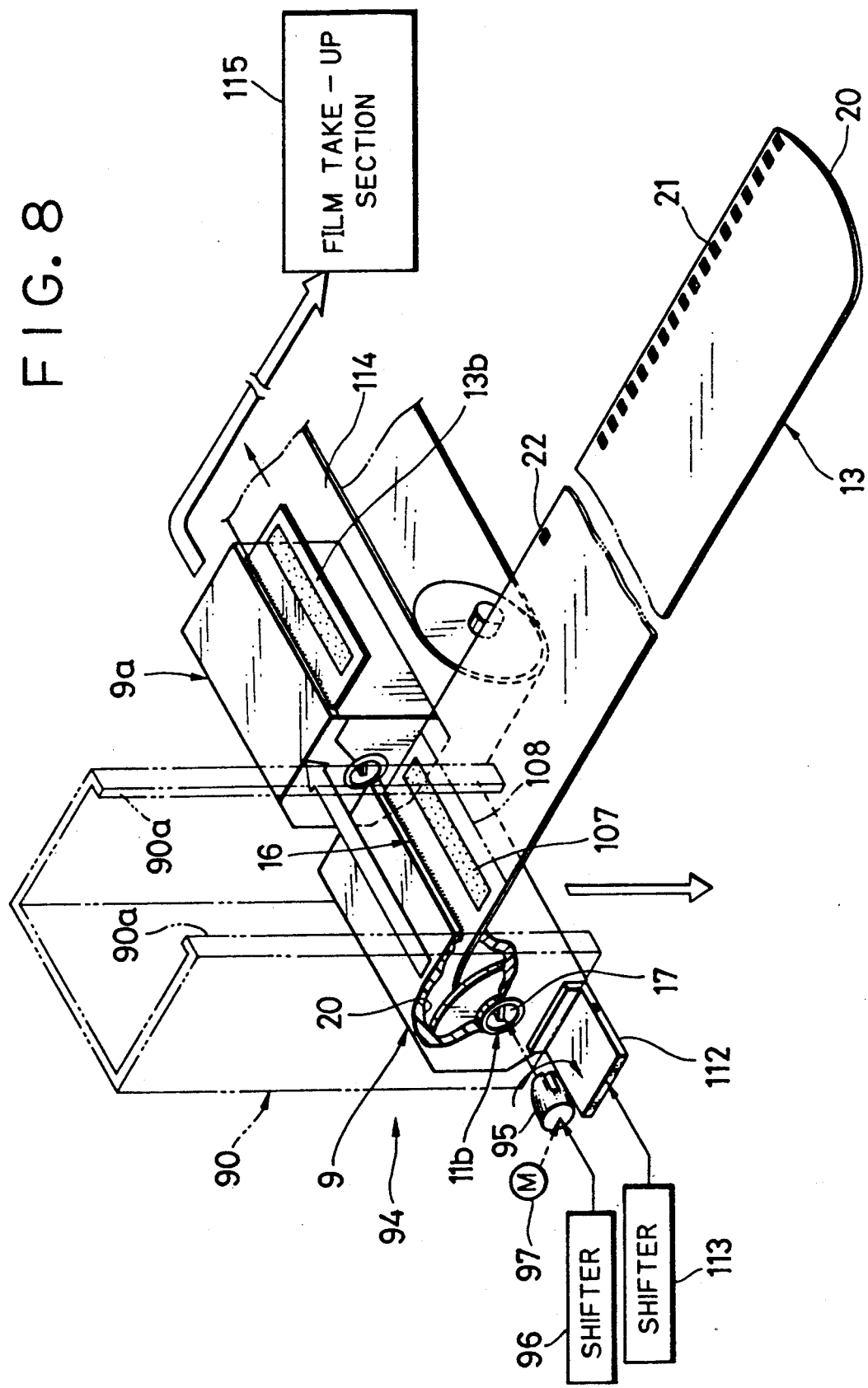
FIG. 8 is a perspective view of a film pull-out stage of a film feeding section in the film processor of FIG. 7, and a film cassette positioned therein.

As shown in FIG. 8, the film pull stage 94 is provided with a fork 95 for rotating the spool 11b of the new type film cartridge 9 when it is positioned in the film pull stage 94, so as to propel the film leader 20 of the new type film 13 outside of the new type film cartridge 9. The fork is movable, by a shifter 96, in the axial direction of the spool 11b between a first position, for engaging the fork 95 with the coupling end 17 of the spool 11b, and a second position, at which the fork 95 is disengaged from the coupling end 17. A motor 97 rotates when the fork 9 is in the first position, so as to rotate the spool 11b in the unwinding direction, and thus propel the film leader 20 outside of the new type film cartridge 9.

As shown in FIG. 7, a film transporting section 98, for transporting the photographic film pulled out at the film pull stage 94 toward a developing section 99, has a film cartridge type discriminating sensor 100, a pair of film nip rollers 101, a cutter 102, a film leader sensor 103 and a pair of film feed rollers 104 in sequence from the film pull stage 94. The film cartridge type discriminating sensor 100 discriminates the type of the film cartridge positioned in the film pull stage 94, for example, between a new type film cartridge 9 and a 135-type film cartridge 8, depending on whether the film leader protrudes from the cartridge. That is, the sensor 100 determines the film cartridge as a new type film cartridge 9 when the film leader does not protrude. The film type discriminating sensor 100 outputs a discrimination signal to a controller 110 which can be a conventional microcomputer. The controller 110 then stores the discrimination signal in RAM and controls respective elements, including the solenoids 93a to 93d, depending on the discriminated film type, in a predetermined sequence based upon a program in ROM of the controller 110. That is, when a new type film cartridge 8 is positioned in the film pull stage 94, the controller 110 activates the shifter 96 and the motor 97, so as to propel the film leader 20 out of the new type film cartridge 9.

The nip rollers 101 are placed in a retracted position so as not to interfere with the film leader protruding from the 135-type film cartridge 8 while the new type film cartridge 9 or 135-type film cartridge 8 is being positioned in the film pull stage 94. After positioning the film cartridge in the film pull stage 94, the nip rollers 101 are placed in an operable position for nipping the film. At that time, in the case of a 135-type film cartridge 8. The nip rollers 101 nip the film leader of the film 12 that is previously pulled out, and then start rotating so as further to pull out the film 12. In the case of a new type film cartridge 9, the film leader 20 of the new type film 13 is propelled outside the cartridge 9 and, thereafter, upon detection by the film leader sensor 103 of the film leader 20, the nip rollers 101 nip the film leader 20 so as further to pull out the film 13.

The film feed rollers 104 transport the film to the developing section 99 in cooperation with another pair of film feed rollers 105 disposed at the entrance of developing section 99. In order to absorb the delay time inevitable for cutting off the film and thus to keep the speed of film fed to the developing section 99 constant, the transporting speed of the film feed rollers 105 is slightly less than that of the film feed rollers 104 such that a loop of predetermined length is formed between roller pairs 104 and 105.

The cutter 102 cuts off the film near the film trailing end, from the 135 type film cartridge 8 or the new type film cartridge 9 when the film has been fully pulled out therefrom. A small portion of the film trailing end remains attached to the spool 10b or 11b of the cartridge 8 or 9.

The new type photographic film 13 has a layer of hot melt adhesive on area 107 formed between a final available frame and the spool 11b on a back surface opposite the photosensitive emulsion surface of the new type film 13, as shown in FIG. 8. When the new type film 13 is fully drawn out of the housing 11b for development, the exposed new type film 13 is cut by the cutter 102, along a line 108, between the final frame and the hot-melt adhesive area 107 so as to keep the remaining portion of the film 13, that includes the hot-melt adhesive area 107 attached to the spool 11b. The remaining film portion 13b serves as a connecting sheet for connecting the developed new type film 13 to the spool 11b and rewinding the developed new type film 13a into the emptied new type cartridge 9a. It is to be noted that the hot-melt adhesive area 107 may be disposed on the photosensitive emulsion layer or on both surfaces of the photographic film 13. When both surfaces are provided with an adhesive area, efficiency in the developing process is improved because either adhesive area may be used for connecting the developed new type film 13a.

A large increase of the load of pulling out the film, or a movement of the cartridge toward the pulling direction indicates that the film has been entirely pulled out of the cartridge 8 or 9 In the 10 alternative, a mechanically detectable and mark near the film trailing end can be provided.

After the 135 type film 12 or new type film 13 is cut off, the emptied cartridge 135 type 8a or emptied new type cartridge 9a is ejected from the cartridge feeder 90 in two directions, depending on the cartridge type. That is, the emptied 135-type film cartridge 8a is allowed to fall into a discard box, or the like, as is described above. On the other hand, the emptied new type film cartridge 9a is pushed sideways by an ejecting bracket 112, outside the film pull stage 94, so as to be placed on a cartridge conveyor 114 which consists of conveyor belts, or the like, as shown in FIG. 7. Shifter 113 drives the ejecting bracket 112. The cartridge conveyor 114 transports the emptied new type film cartridge 9a toward a film wind-up section 115 of the film processor.

As shown in FIG. 7, the cartridge conveyor 114 and a second cartridge conveyor 116 are connected to the film wind-up section 115. The second conveyor 116 is adapted to transport preservation cartridges 30, as described in the above embodiment, for receiving the 135-type films 12a after development. Depending on the discrimination signal detected by the film cartridge type discriminating sensor 100 and stored in the controller 110, either one of the cartridge conveyors 114 and 116 is selectively driven by an associated motor 117 or 118, so as to position a corresponding one of the emptied new type film cartridge 9a and the preservation cartridge 30 in the film wind-up section 115.

Figure 9:
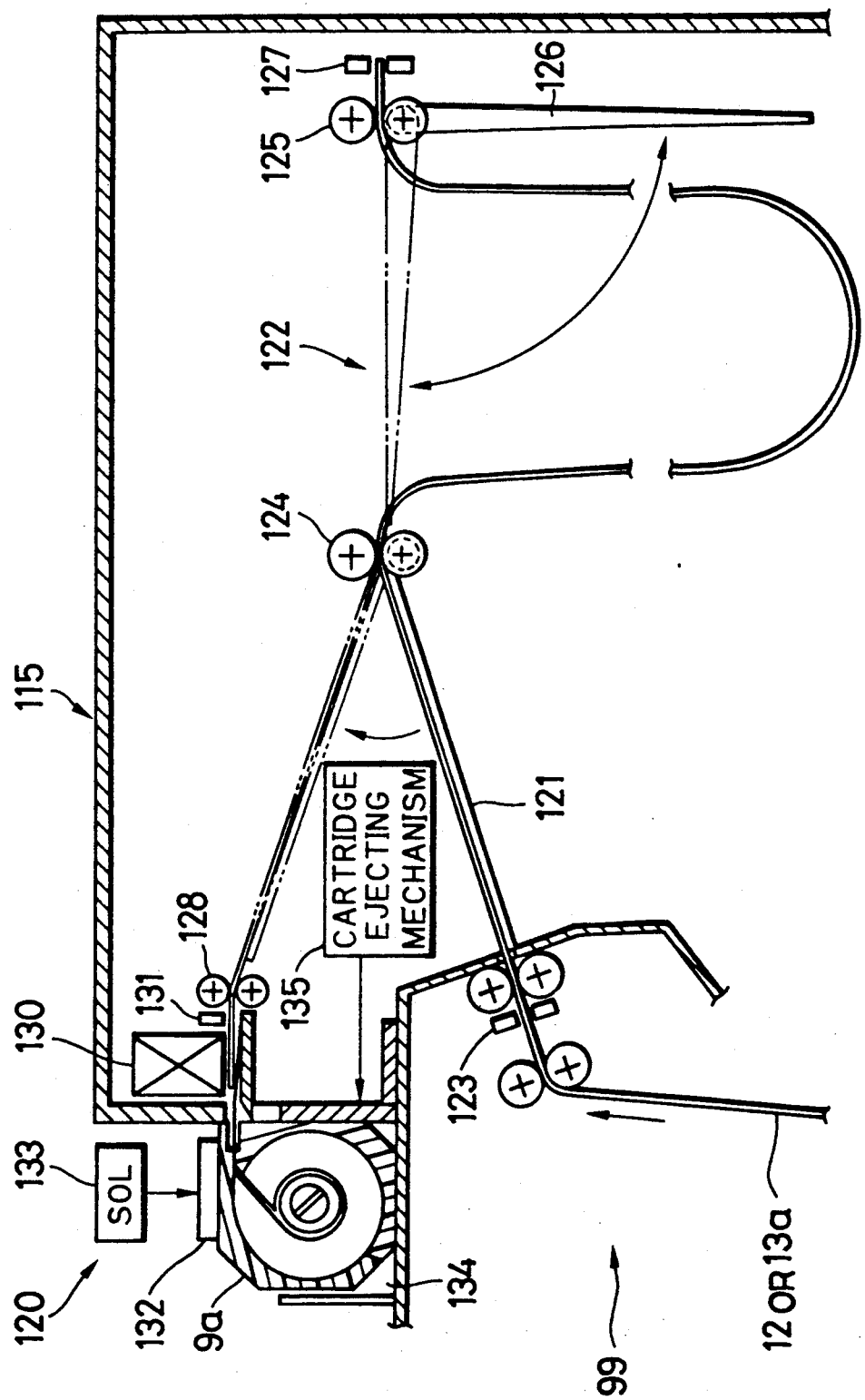
FIG. 9 is a schematic view of a film wind-up section of the film processor of FIG. 7.

FIG. 9 shows the detail of the film wind-up section 115 The film wind-up section 115, which is disposed at an outlet of the developing section 99, includes a film wind-up stage 120, a swingable guide plate 121 and a film reservoir 122. The guide plate 121 guides the developed film 12a or 13a from the outlet of the developing section 99 toward the film reservoir 122 when a film end sensor 123 detects the film leader of that film. Upon detection of the film trailer by the film end sensor 123, the guide plate 121 swings upwards to guide the film trailer reversely toward the film wind-up stage 120, as is shown by chain-dotted lines. The film reservoir 122 has two pairs of nip rollers 124 and 125 to store the developed film 12a or 13a in a loop there-between. A swingable guide plate 126 is movable into a position between the roller pairs 124 and 125 as shown by chain-dotted lines, so as to guide the film leader toward the nip rollers 125. A film leader sensor 127 is disposed beyond the nip rollers 125 along the film passageway, so as to detect that the film leader is completely nipped by the nip rollers 125. After the film leader is nipped between the nip rollers 125, the guide plate 126 returns to a rest position as shown by the straight line, and the nip rollers 125 stop rotating, while the nip rollers 124 continue to rotate. As a result, the developed film is stored in the film reservoir 122 in a loop.

A pair of film feed rollers 128 and a film splicer 130 are disposed at the entrance of film winding stage 120. The film splicer 130 connects the film trailer of the developed film 13a or 12a to the connecting sheet 13b or 33, which protrude outside the emptied new type film cartridge 9a or the film preservation cartridge 30 respectively FIG. 9 shows the case where a new type developed film 13a is to be wound up. The film trailer is positioned at the film splicer 130 such that the film is transported a predetermined distance by the film feed rollers 128 after a film trailer sensor 131 detects the film trailer.

The film wind-up stage 120 is provided with a cartridge holder 132 movable by a solenoid 133. The cartridge holder 132 holds the emptied new type cartridge 9a or preservation cartridge 30 on a supporting member 134 so as to prevent the cartridge from moving during winding up of the developed film. After winding, the cartridge holder 132 moves away from the cartridge. A fork is provided for engaging and rotating the spool 11b or 32 in the winding direction and a shifter is provided for moving the fork in an axial direction. These elements are similar to the fork 95 and the shifter 96 shown in FIG. 8 and thus not illustrated in FIG. 9. After the developed film 13a or 12a connected at its trailing end to the connecting sheet 13b or 33 has been completely wound up on the spool 11b or 32 by rotating the spool, respectively, the emptied new type cartridge 9a or preservation cartridge 30, containing the developed film 13a or 12a, is ejected from the film windup stage 120 by means of a cartridge ejecting mechanism 135 comprising an ejecting bracket and a shifter which are analogous to those shown in FIG. 8 and thus not illustrated in FIG. 9. The film wind-up section 115 also includes a film type data recorder 136 which records, based on the discrimination signal stored in the controller 110, film type data into the IC memory 31 of the preservation cartridge 30. The film type data recorder 136 is similar to the plug 44 of the printer-processor shown in FIG. 5.

Figure 10:
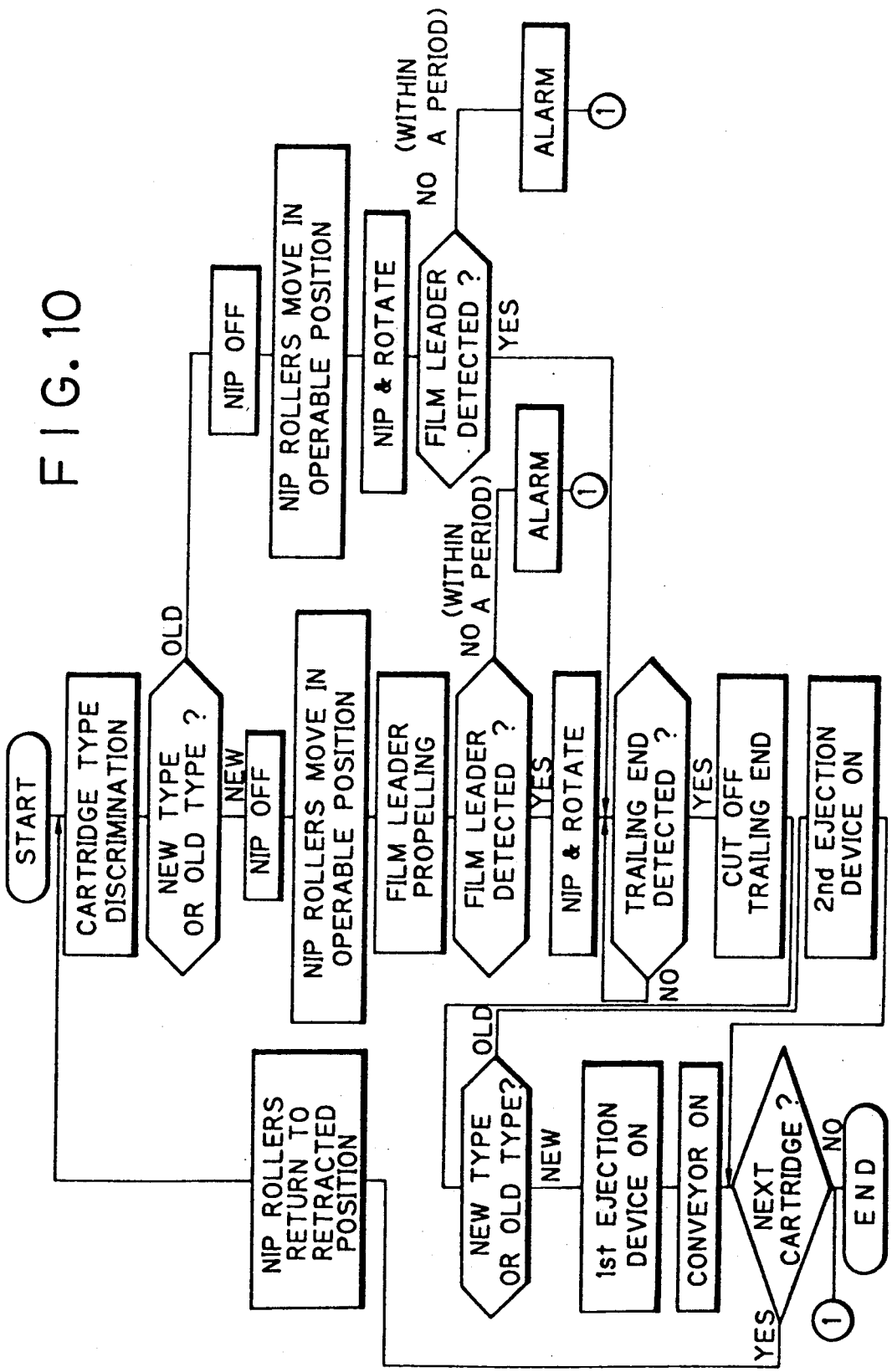
FIG. 10 is a flowchart explaining a sequence of film feeding section of the film feeding section of the film processor.

The operation of the above-described film 10 processor according to the second embodiment will be described with reference to the flowchart of FIG. 10.

First, 135 type film cartridges 8 and new type film cartridges 9 are inserted in the cartridge feeder 90 without distinction. During insertion of the cartridges, the stopper pins 92a to 92c are moved outside the cartridge feeder 90 by energizing the solenoids 93a to 93c, so that the film cartridges 8 and 9 are piled on one another in the cartridge feeder 90. Thereafter, the solenoids 93a to 93c are switched off, allowing the stopper pins 92a to 92c to jump into the cartridge feeder 90 between the film cartridges 8 and 9 therein. The stopper pins 92a to 92d prevent the film cartridges 8 and 9 from dropping out of the cartridge feeder 90.

Each time a 135 type film cartridge 8 or a new type film cartridge 9 is positioned in the film pull stage 94, the film cartridge type discriminating sensor 100 determines whether the film cartridge is a new type or a 135-type. The discrimination signal from the film cartridge type discriminating sensor 100 is sent to the controller 110. The controller 110 then controls film pull out operation from the cartridge 8 or 9 based on the discrimination signal.

In the case of a new type film cartridge 9, the nip rollers 101 are moved from the retracted position to the operable position while being set in released condition. Then, the fork 95 is engaged in the spool 11b of the new type film cartridge 9, and rotates the spool 11b so as to propel the film leader 20 outside the new type film cartridge 9. When the film leader sensor 103 detects the film leader 20, the controller 110 sets the nip rollers 101 in a nipping position and causes the nip rollers 101 to rotate so as to pull out the new type film 13. Thereafter, the fork 95 is disengaged from the spool 11b.

In the case of a 135-type film cartridge 8, the nip rollers 101 are moved from the retracted position to the operable position, while first being set in a released condition, and then set in nipping condition, nipping the film leader previously pulled out of the 135 type film cartridge 8. Thereafter, by rotating the nip rollers 101, the 135 type film 12 is further pulled out.

The pulled out film 12 or 13 is transported by the film feed rollers 104 and 105 toward the developing section 99. When it is determined, based on an increase in the load of film pulling, that the film 12 or 13 is pulled out as far as possible, the film 12 or 13 is cut off at or near the film passage mouth of the cartridge 8 or 9, that is, along the cutting line 108 for the new type film 13. Then, according to the film cartridge type indicated by the discrimination signal from the controller 110, either a first cartridge ejecting device, consisting of the bracket 112 and the shifter 113, or a second cartridge ejecting device, consisting of the solenoid 93d and the stopper pin 92d is activated so as to eject the emptied new type film cartridge 9a or the emptied 135-type film cartridge 8a, respectively, so that the emptied new type film cartridge 9a is placed on the cartridge conveyor 114 and thus transported to the film wind-up section. The emptied 135-type film cartridge 8a is sent to a discard box.

Then, the solenoids 93a to 93c of the cartridge feeder 31 are sequentially activated to retract the stopper pins 92a to 92c in order, starting from the bottom, for a time period necessary for dropping each cartridge to the next stage, thereby positioning the lowest cartridge 8 or 9 to the film pull stage 94. Thereafter, the film cartridge type is discriminated, and the film is pulled out in the same sequence as above according to the discriminated film cartridge type.

When a strip of film has been developed has and completely left the developing section 99, that is, when the film trailer exists the developing section 99, the swingable guide plate 121 moves to the side of the splicer 130. Then, the film trailer is positioned into the splicing position by rotating the film feed rollers 73 and 87 in an appropriate direction based on the detection signal from the film trailer sensor 128. The splicer 130 connects the film trailer to the connecting sheet 13b or 33 through the hot-melt adhesive layer, a splice tape, or the like.

The film connected to the spool 11b or 32 is wound into the empty new type cartridge 9a or preservation cartridge 30 by rotating the spool. In the case of a preservation cartridge 30, corresponding film type data may be recorded in the IC memory 31, through the recorder 136, during winding of the 135 type film 12a. After winding up the whole film, the emptied new type cartridge 9a or preservation cartridge 30 is ejected from the film wind-up stage 120 by means of the cartridge ejecting mechanism 135. Next, another empty cartridge 9a or 30 is positioned in the film wind-up stage 120 by rotating either one of the cartridge conveyors 114 and 116 corresponding to the type of the film to be wound up. In the same way as above, the following film cartridges 8 and 9 are subjected to developing and are wound up.

It is to be noted that it is also possible to eject the new type emptied film cartridges 9a into a discard box and, thereafter, place them on the cartridge conveyor 114. In this case, since it is unnecessary to keep the inner room of the film cartridge light-tight, it is preferable to remove the light trapping fabric 19 from the film passage mouth 16 of the emptied new type film cartridge 9a so as to reduce the load of film leader propelling.

It is still possible to connect the film leader to a leader guide sheet for guiding the film through respective processing tanks of the film processor, so as to prevent jamming of the film. In this case, the leader guide sheet is separated from the film after development, before the film trailer of the film is connected to the connecting sheet of the empty cartridge.

Although the above described embodiments relate to separate film processor and printer-processors, it is, of course, possible to apply the present invention to such a photofinishing unit comprising a film processor section and a printer-processor section.

Furthermore, the present invention may not be limited to the case where the above described new type films and conventional 135-type films are processed together, but may be applicable to other cases, for example, where 126-type films and 135-type films are processed together or where more than two types of films are processed together.

Thus, it will be apparent to those skilled in the art that various changes and modifications of the present invention are possible without departing from the scope and spirit of the appended claims.

What is claimed is:

1. A method of handling a plurality of exposed photographic films of different types which are contained in individual film cartridges, said method comprising the steps of:
developing said photographic films;
winding up each of said developed photographic films individually into corresponding wind-up cartridges; and
recording identification data on each of said wind-up cartridges, said identification data indicating the type of one of said photographic films wound in a corresponding one of said wind-up cartridge.

2. A method as recited in claim 1, wherein a leading end of said photographic film contained in said windup cartridge can be propelled to the outside of said cartridge by rotating a spool disposed in said windup cartridge in an unwinding direction so as to unwind said photographic film.

3. A method as recited in claim 2, further comprising the steps of:
reading said identification data from said wind-up cartridge during a printing process of said photographic film contained therein;
changing a printing sequence, of said printing process, according to the film type indicated by said identification data; and
rewinding said photographic film into said wind-up cartridge after said printing process is completed.

4. A method as recited in claim 3, wherein said photographic films are removed from said individual film cartridges before said developing process.

5. A method as recited in claim 4, wherein said recording step occurs before said winding step and each of said photographic films are wound up into one of said wind-up cartridges having said identification data which corresponds to a type of said photographic film wound therein.

6. A method as recited in claim 5, further comprising the steps of:
discriminating the type of each of said photographic films before developing;
memorizing said identification data relating to the discriminated film types in a sequence corresponding to the sequence of developing of said photographic films; and
selecting one of said wind-up cartridges before winding up one of said photographic films, having identification data corresponding to the type of each of said photographic films, with reference to said memorized data.

7. A method as recited in claim 6, wherein said identification data is recorded as a plurality of film type marks each indicating a different film type.

8. A method as recited in claim 7, wherein said film type marks are a pattern printed in electroconductive ink on an outer surface of said wind-up cartridge.

9. A method as recited in claim 7, wherein said film type mark consists of at least a projection disposed on an outer surface said wind-up cartridge.

10. A method as recited in claim 3, wherein said windup cartridge is a cartridge specific to winding up a developed photographic film of any type, and said recording step occurs during said winding step.

11. A method as recited in claim 10, further comprising the steps of:
discriminating the type of each of said photographic films before developing;
memorizing a set of data relating to the discriminated film types; and
said recording step and said winding step are executed simultaneously based on said set of data.

12. A method as recited in claim wherein said wind-up cartridge is provided with an IC memory in which said identification data is recorded.

13. A method as recited in claim 12, wherein print data of the photographic film detected during printing is recorded in said IC memory during said rewinding step.

14. A method as recited in claim 13, wherein a first type of said films has film type data recorded thereon, and said film type data is read so as to be recorded in said IC memory as said identification data during said recording step.

15. A method as recited in claim 14, wherein, if said first type of said films has photographic data other than said film type data recorded thereon, said photographic data is also recorded in said IC memory during said recording step.

16. A method as recited in claim 2, wherein emptied of said film cartridges of a predetermined type, having the same shape as said wind-up cartridges, from which said photographic films have been removed for development are reused as said wind-up cartridges.

17. A method as recited in claim 16, wherein said photographic films removed from said emptied film cartridges are separated during said developing step, such that a trailing end portion of said film remains protruding from each of said emptied film cartridges and attached to a spool contained rotatably in said cartridges, said trailing end portion being used as a connecting sheet for connecting said developed film to said spool, so as to wind up said developed film, during said winding step, by rotating said spool.

18. A method as recited in claim 2, wherein there are first and second film types, said first type films are each contained in a first type cartridge having the same shape as said wind-up cartridge, said second type films are each contained in a second type cartridge having a different shape than said wind-up cartridge, and wherein said first type film pulled out after exposure from said first type cartridge is separated therefrom during said developing step, such that a trailing end portion of said first type film remains protruding from said first type cartridge and attached to a spool contained rotatably in said first type cartridge said trailing end portion being used as a connecting sheet for connecting said developed film to said spool, so as to wind up said first type film during said winding step by rotating said spool, and said second type films after development are wound up individually into said wind-up cartridges having a connecting sheet for connecting said second type film to a spool of said wind-up cartridge.

19. A method as recited in claim 18, wherein emptied first type cartridges are sent to a film wind-up device, which is positioned so as to execute said winding step, by a conveyor.

20. A method as recited in claim 19, wherein said first type cartridge is capable of propelling a leading end portion of said first type photographic film contained therein outside of said first type cartridge by rotating said spool in a direction so as to unwind said first type photographic film, and said second type cartridge does not have the capacity to propel a leading end portion of said second type photographic film outside of said second type cartridge.

21. A method as recited in claim 20, further comprising the steps of:
   pulling out the leading end of said second type film from said second type cartridge;
   placing said first and second type film cartridges in a cartridge feeder;
   discriminating the type of each of said photographic films before development based upon whether the leading end of said photographic film protrudes from said film cartridge in a film pull-out position of said cartridge feeder;
   memorizing data relating to the discriminated film type;
   feeding said photographic films from said film cartridge positioned in said film pull-out position toward a film processor for said developing step if said film is said first type of film, the leading end thereof is propelled out of said first type film cartridge and, thereafter, is nipped to be pulled out by a pair of nip rollers, if said film is of said second type, the film leader thereof, pulled out during said pulling step is nipped to be further pulled out by said nip rollers; and
   positioning either the emptied of said first type film cartridge or said wind-up cartridge in said film wind-up device in accordance with said memorized set of data.

22. A method as recited in claim 21, wherein said second type cartridge is placed in said film pull-out position with a cartridge adapter attached thereto, said cartridge adapter having a film port positioned so as to protect the leading portion end of said second type film protruding from said second type film cartridge and a cut out portion is formed in said film port for allowing access by said nip rollers to said leading end portion of said second type film.

23. A method as recited in claim 22, wherein said wind-up cartridge is provided with an IC memory in which said film type data is recorded during said recording step.

24. A method as recited in claim 23, wherein print data of said photographic film detected during printing, is recorded in said IC memory during said rewinding step.

25. A method as recited in claim 24, wherein said first type cartridges are previously provided with said film type data.

26. A film processor for processing photographic films which are rewound into individual cartridges of different shapes after exposure, said film processor comprising:
   a storage device which stores said cartridges of different shapes containing exposed films at random;
   a conveyor coupled with said storage device so as to feed said stored cartridges seriatim to a film pull-out position;
   means for pulling out and cutting off said photographic film from each of said cartridges in said film pull-out position;
   a discriminator located proximate said film pull-out position so as to discriminate and memorize the type of said cartridge positioned in said film pull-out position;
   processing means for developing said photographic film pulled out from the cartridge;
   a wind-up device disposed proximate an exit of said processing means so as to wind up said photographic film after development;
   means for selecting a wind-up cartridge, with an identification mark corresponding to a type of said cartridge from which said photographic film to be wound up was previously contained, from among a plurality of said wind-up cartridges provided with different identification marks, in accordance with said memorized cartridge type, and positioning said selected wind-up cartridge in said wind-up device.

27. A film processor for processing photographic films which are rewound into individual cartridges of different shapes after exposure, said film processor comprising:
   a storage device which stores said cartridges of different shapes containing exposed films at random;
   a conveyor coupled with said storage device so as to feed said stored cartridges seriatim to a film pull-out position;
   means for pulling out and cutting off said photographic film from each of said cartridges in said film pull-out position;
   a discriminator located proximate said film pull-out position so as to discriminate and memorize the type of said cartridge positioned in said film pull-out position;
   processing means for developing said film pulled out from the cartridge;
   a wind-up device, disposed proximate an exit of said processing means, so as to wind up said photographic film after development into a wind-up cartridge, said wind-up cartridge having a capacity to store data therein; and
   means for writing data relating to a type of said cartridge in said windup cartridge on winding up said photographic film, in accordance with said memorized cartridge type.

28. A film processor as recited in claim 27, wherein said wind-up cartridge has a built-in IC memory in which said data is stored.

* * * * *